(12) United States Patent (10) Patent No.: US 8,048,307 B2
Lee (45) Date of Patent: Nov. 1, 2011

(54) DYNAMIC FILTRATION DEVICE USING CENTRIFUGAL FORCE

(76) Inventor: Brent Lee, Saratoga, CA (US)

( * ) Notice: Subject to any disclaimer, the term of this patent is extended or adjusted under 35 U.S.C. 154(b) by 19 days.

(21) Appl. No.: 12/538,825

(22) Filed: Aug. 10, 2009

(65) Prior Publication Data

US 2010/0044309 A1 Feb. 25, 2010

Related U.S. Application Data

(60) Provisional application No. 61/188,954, filed on Aug. 14, 2008.

(51) Int. Cl.
*B01D 63/00* (2006.01)
*C02F 1/44* (2006.01)

(52) U.S. Cl. ........ 210/637; 210/633; 210/781; 210/787; 210/321.67; 210/321.72; 210/433.1

(58) Field of Classification Search ............. 210/231.67, 210/321.68, 330, 331, 359, 360.1, 361, 253, 210/282, 321.79, 459, 512.1
See application file for complete search history.

(56) References Cited

U.S. PATENT DOCUMENTS

| | | | |
|---|---|---|---|
| 3,955,755 A | 5/1976 | Breillatt, Jr. et al. | |
| 4,077,887 A * | 3/1978 | Langvik | 210/331 |
| 4,133,657 A | 1/1979 | Krogsrud | |
| 4,156,600 A | 5/1979 | Jacobson | |
| 4,160,732 A * | 7/1979 | Maffet | 210/808 |
| 4,287,058 A | 9/1981 | Larsen | |
| 4,592,848 A | 6/1986 | Pabst | |
| 5,562,758 A | 10/1996 | Awaji | |
| 5,707,517 A * | 1/1998 | Rolchigo et al. | 210/232 |
| 7,282,146 B2 | 10/2007 | Mannheim et al. | |
| 7,306,735 B2 | 12/2007 | Baggott et al. | |
| 2002/0179516 A1 * | 12/2002 | Behrendt et al. | 210/321.8 |
| 2005/0056590 A1 | 3/2005 | Baggott et al. | |
| 2007/0039869 A1 * | 2/2007 | Lovizzaro | 210/331 |
| 2008/0047895 A1 | 2/2008 | Elefritz, Jr. et al. | |
| 2008/0245737 A1 | 10/2008 | Coulter | |
| 2008/0245738 A1 | 10/2008 | Coulter | |
| 2009/0107922 A1 | 4/2009 | Zhang et al. | |

OTHER PUBLICATIONS

Peter M. Wild, Geoffrey W. Vickers; "The Technical and Economic Benefits of Centrifugal Reverse Osmosis Desalination"; Desalination, 89 (1992) 33-40; Elsevier Science Publishers B.V., Amsterdam.

(Continued)

*Primary Examiner* — Marc Zimmer
*Assistant Examiner* — Allison M Gionta
(74) *Attorney, Agent, or Firm* — The Law Offices of Andrew D. Fortney; Andrew D. Fortney; William K. Nelson

(57) ABSTRACT

The present invention generally relates to a filtration system having one or more apparatuses for filtering gases, liquids, or fluids (e.g., water) to remove particulate matter, and methods of making and using the apparatus. More particularly, embodiments relate to apparatuses and methods for applying centrifugal force(s) to push a fluid or gas to be filtered through a porous membrane or filter within the apparatus to separate particulate matter therefrom. The present invention takes advantage of the Coriolis effect within a cylindrical filter radiating out from a rotating central body. The filtration apparatus provides an energy efficient system for microfiltration (or other filtration process) to remove contaminants from gases and fluids, such as waste water.

24 Claims, 10 Drawing Sheets

OTHER PUBLICATIONS

International Search Report and Written Opinion; International Application No. PCT/US2009/053329; Dated Sep. 21, 2009; 7 pages; International Searching Authority/United States, Commissioner for Patents, Alexandria, Virginia.

International Preliminary Report on Patentability; International Application No. PCT/US2009/053329; Feb. 15, 2011; 6 pages; The International Bureau of WIPO; Switzerland.

* cited by examiner

DYNAMIC FILTRATION DEVICE USING CENTRIFUGAL FORCE

RELATED APPLICATIONS

This application claims the benefit of U.S. Provisional Application No. 61/188,954, filed Aug. 14, 2008, which is incorporated by reference herein in its entirety.

FIELD OF THE INVENTION

The present invention generally relates to a gas or fluid filtration system having one or more apparatuses for filtering gases and/or fluids (e.g., water) to remove particulate matter therefrom. The present invention also relates to a method of making the apparatus(es), and a method of filtering gases and/or fluids using the apparatus. In one embodiment, the invention relates to a method of making a metal filter membrane. More particularly, embodiments of the present invention relate to apparatuses and methods that generate centrifugal force and/or that take advantage of the Coriolis effect to push a gas or fluid to be filtered through a porous membrane or filter within the apparatus(es) and separate a gas or liquid from particulate matter.

BACKGROUND

Microfiltration, ultra filtration, and reverse osmosis all involve the physical separation particulate matter from a fluid. In general, particulate contaminants may be removed by mechanical filtration methods, provided the filter has pores small enough to exclude the particles. Substances that are larger than the pores in membranes are fully removed. Substances that are smaller than the pores of the membranes are partially removed, depending on the structure or construction of a refuse or filtrate layer on the membrane.

In the case of water purification (e.g., industrial, municipal, and/or residential water purification), the extent to which dissolved solids, turbidity, microorganisms, and ions are removed is determined by the size of the pores in the membranes. FIG. 7 provides a scale of various pore sizes and/or size ranges along with the types of materials (e.g., particulate matter) that can be filtered from a fluid by a filter membrane having the identified pore sizes. Microfiltration utilizes membranes with a pore size of 0.1 to 10 microns, which can remove virtually all bacteria from the water to be filtered. Ultra-filtration (UF) membranes typically have pore sizes in the range of 0.01 to 0.10 microns and can efficiently remove bacteria and most viruses, colloids (e.g., lead), and silt.

Separation efficiency is increased with filters containing smaller pore sizes, although higher pressures are needed to maintain flow through the filter. Thus, a filter having a smaller pore size requires a high-pressure pump or other means of creating high pressure. Such equipment typically requires and consumes a relatively large amount of energy to carry out the filtration process, and may require relatively complex and/or costly techniques to clean the filters.

A method commonly used to separate solids from liquids includes passing a mixture of solids and liquids through a tubular membrane or filter. Such filters are typically used, for example, in reverse osmosis processes. Such separation processes require high fluid pressures to push the liquid through the filter and separate the liquid from contaminants. Typically, the high fluid pressure is achieved by using a high-pressure pump. These high-pressure pumps consume large amount of energy in creating adequate filtration pressures, especially as the amount of particulate matter blocking the pores increases. There is a continuing need for more energy-efficient fluid filtration systems.

Centrifuges and other machines that use centrifugal force (and optionally, a filter) to separate fluid components from solid-phase materials (e.g., a washing machine) provide energy efficiencies with regard to the inertia created by the spin of the drum or rotor around a central drive shaft. There are known centrifugal filtration systems (e.g., a household washing machine) for separating liquids (water) from solids (fabric/clothing). However, application of this type of apparatus to perform other tasks such as wastewater treatment, recycling industrial solvents, pharmaceutical and blood product purification, and water purification in food product industries encounter several technical difficulties and limitations. For example, practical applications of a centrifugal system for separating particulate contaminants from water in waste water treatment are generally limited by the filter(s) and their suitability for separating certain types of particulate matter (e.g., the holes may be too large to separate most of the suspended solids in the waste water).

Therefore, a need still exists in the art for new and improved systems, configurations and operational processes that can separate particulate matter from relatively high volumes of fluid or gas with greater efficiency, scalability, and ease of cleaning.

SUMMARY OF THE INVENTION

Embodiments of the present invention relate to filtration systems (e.g., water or gas filtration systems) and methods of using the same that are capable of efficiently removing particulate matter from a fluid or gas and that are relatively easy to clean. Other embodiments of the present invention relate to methods of making the present filtration system and to making a modified metal filter suitable for use in such a filtration system.

It is therefore an aspect of the present invention to provide a novel apparatus and method for filtering particulate matter from fluids and/or gases in a continuous operation, such that aforementioned difficulties and/or limitations encountered in conventional devices and methods can be resolved or overcome. Specifically, it is an aspect of the present invention to provide a novel filtration system that uses centrifugal force and/or the Coriolis effect to efficiently separate particulate matter from gases and/or fluids that the user seeks to purify.

A first aspect of the present invention concerns a filtration system, comprising one or more apparatuses comprising an inlet for receiving an influent to be filtered; a rotating central drum, shaft or other body having an influent distribution unit therein, the influent distribution unit having a central receiving pipe adapted to receive the influent and a plurality of delivery pipes extending radially from the central receiving pipe; a plurality of filters, arranged circumferentially around the central body, each attached to one of the plurality of delivery pipes and each having an inlet configured to receive the influent from the attached delivery pipe, a distal end through which a concentrate passes, and one or more porous tubular membranes with a pore diameter of up to about 500 µm; one or more outer chambers, each surrounding one or more of the filters, each outer chamber being configured to collect a permeate passing through the filter(s); a plurality of permeate collection pipes, each attached to one of the outer chambers and configured to transport permeate away from the outer chamber; a plurality of concentrate collection pipes, each attached to a distal end of one of the filters or one of the outer chambers and configured to transport the concentrate away from the filter; and a drive mechanism or motor configured to rotate the central body and the filters (e.g., around a central axis).

In second aspect, the present invention relates to a method of filtering an influent, the method comprising delivering the influent into one or more filtration units having a central drum or other body and an influent distribution unit therein adapted to deliver the influent to a plurality of filters extending radially from the central body, each of the plurality of filters having a distal end adapted to pass a concentrate therethrough and one or more porous tubular membranes having a pore diameter of up to about 500 μm; rotating the central body at a speed sufficient to filter the influent through the porous tubular membranes; and collecting a permeate in one or more outer chambers surrounding the filters.

A third aspect of the present invention concerns a method of making a filtration apparatus, comprising attaching each of a plurality of filters circumferentially to a corresponding plurality of delivery pipes extending radially from a central receiving pipe in a central drum or other body, each of the filters having a distal end adapted to pass a concentrate therethrough and one or more porous tubular membranes with a pore diameter of up to about 500 μm; placing one or more outer chambers around one or more of the filters, each outer chamber being configured to collect a permeate passing through the filter(s); attaching a first outlet pipe to each of the outer chambers, adapted to collect the permeate; attaching a second outlet pipe to either the distal end of the filter or a distal end of the outer chambers, the second outlet pipe being adapted to collect the concentrate; and operationally joining a drive mechanism or motor to the central body, the drive mechanism or motor being configured to rotate the central body.

The present invention addresses a need to develop an energy-efficient filtration system for wastewater treatment, household water purification, industrial solvent recycling, industrial effluent gas scrubbing and/or recycling, pharmaceutical and blood product purification, and water purification in food product industries, among other filtration applications. Several embodiments of filtration systems and methods of using the same are described herein. The present invention may increase the efficiency (e.g., energy efficiency) of filtration in a number of applications (e.g., waste water treatment). The invention also provides a relatively easy technique for cleaning filters in such an apparatus, system and method. These and other advantages of the present invention will become readily apparent from the detailed description of various embodiments below.

DETAILED DESCRIPTION

Figure 1:
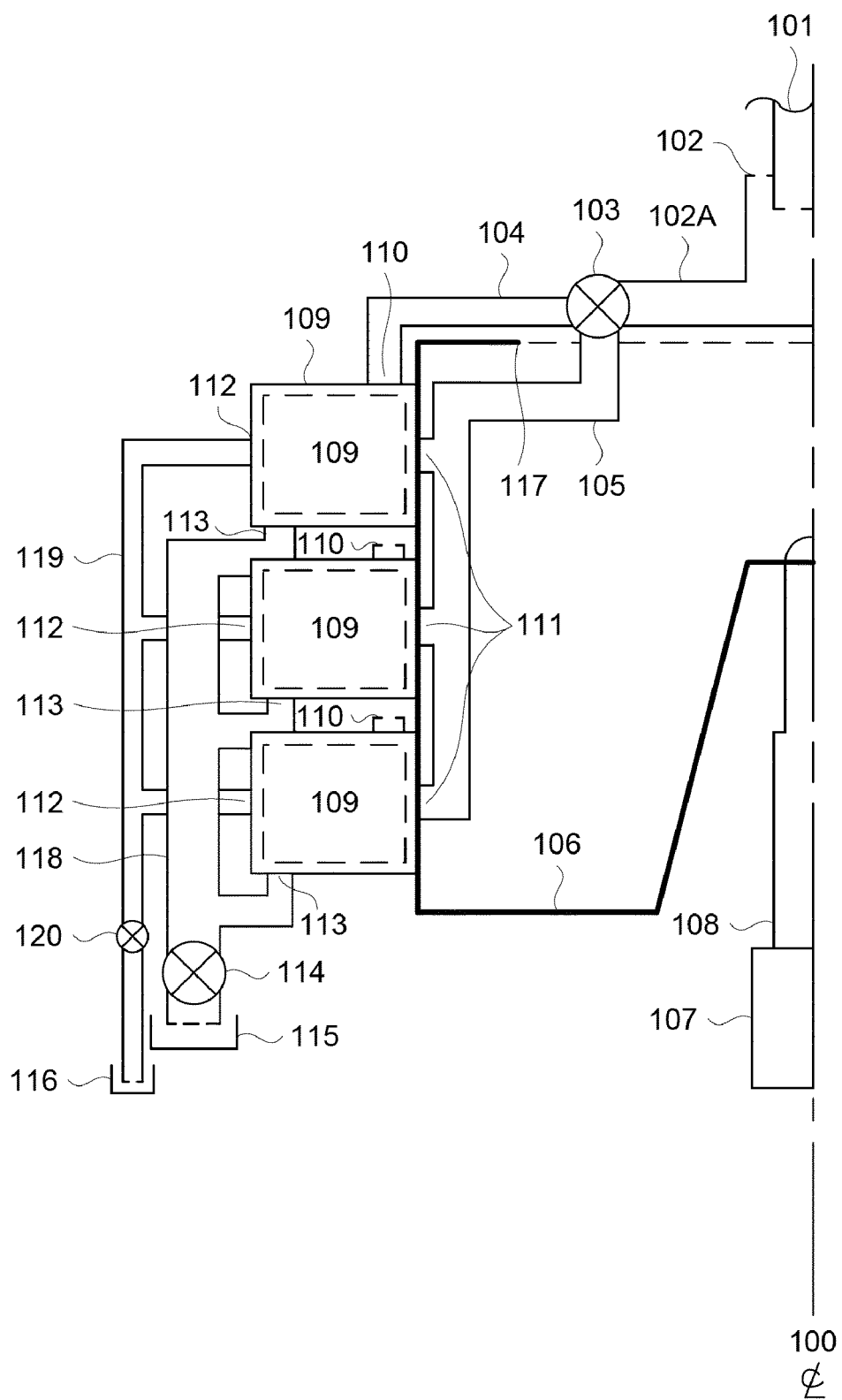
FIG. 1 provides a system diagram showing a cross-sectional view of an exemplary embodiment of a centrifugal filtration apparatus.

Reference will now be made in detail to various embodiments of the invention, examples of which are illustrated in the accompanying drawings. While the invention will be described in conjunction with the embodiments, it will be understood that the description is not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, and components have not been described in detail so as not to unnecessarily obscure aspects of the present invention. In addition, it should be understood that the invention is not limited to the specific permutations and combinations described herein. Specifically, variations that are not inconsistent with each other may be mixed and matched as desired.

For the sake of convenience and simplicity, the terms "coupled to," "connected to," "attached to" and "in communication with" mean direct or indirect coupling, connection, attachment or communication, unless the context clearly indicates otherwise. These terms are generally used interchangeably herein, but are generally given their art-recognized meanings. Also, for convenience and simplicity, the terms "part," "portion," and "region" may be used interchangeably, but these terms are also generally given their art-recognized meanings. Furthermore, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention relate to filtration systems (e.g., gas or fluid filtration systems, such as water filtration systems) and methods of using the same capable of efficiently removing particulate matter from a fluid or gas.

The invention, in its various aspects, will be explained in greater detail below with regard to exemplary embodiments.

Exemplary Fluid Filtration Systems

Embodiments of the present invention concern a filtration system that comprises one or more centrifugal filtration apparatuses. Each filtration apparatus may comprise an inlet for receiving an influent to be filtered, a rotatable central drum or other body having an influent distribution unit therein, a plurality of filters, arranged circumferentially around the central body, one or more outer chambers, a plurality of outlet pipes, and a drive mechanism or motor. The influent distribution unit generally has a central receiving pipe for receiving the influent and a plurality of delivery pipes extending radially from the central receiving pipe. Each filter is typically attached to one of the plurality of delivery pipes, and has an inlet receiving influent from one of the delivery pipes, a distal end through which a concentrated influent ("concentrate") passes, and one or more porous tubular membranes with a pore diameter of up to about 500 µm. The filtration apparatus generally further comprises one or more outer chambers, each surrounding one or more of the filters. Each outer chamber is generally configured to collect a permeate passing through the filter(s). The filtration apparatus also generally includes a plurality of first outlet pipes, each connected to one of the outer chambers for collecting the permeate, and a plurality of second outlet pipes, each connected to the distal end (i.e., away from the rotatable central body) of one of the filters or one of the outer chambers, for collecting the concentrate. The filtration apparatus also includes a drive mechanism or motor configured to rotate the central body and the filters. The present filtration apparatus may be used to remove particulate matter from gases or fluids, and may be suitable for a number of applications for filtering and purifying fluids. For example, the apparatus(es) may be utilized in wastewater treatment, household water purification, industrial solvent recycling, industrial effluent gas scrubbing, pharmaceutical and blood product purification, and water purification in food product industries, among other filtration applications.

FIG. 1 provides a radial cross-section of an exemplary embodiment of a centrifugal filtration apparatus. The exemplary filtration system may include a plurality of individual centrifugal filtration apparatuses. The number of filtration apparatuses in the filtration system may be adequate to process a minimum threshold amount or an average amount of gas or fluid in the application for which the filtration system is employed. For instance, the present fluid filtration system can be used for household water purification. In such an application, a single centrifugal filtration apparatus may be adequate to provide, for example, from 100 to 2000 liters of purified drinking, irrigation and/or wash water per day to a single household. However, in a municipal water treatment plant, depending on the size of the area serviced by the water treatment plant, the fluid filtration system may include tens to hundreds of filtration apparatuses, which may provide 500,000 to 10,000,000 or more liters of purified water per day. The filtration system described herein can be used for a broad range of filtration and purification applications. The number of the apparatus(es) included in the fluid filtration system depends on the requirements of the application for which it is used.

The filtration apparatus(es) may be configured to filter a fluid influent that may include an aqueous and/or organic fluid, which may include solids and/or particulates therein. For example, the filtration system may be configured to filter particulate matter from contaminated water in a waste water treatment plant, or may be configured to purify a solvent containing precipitated contaminants. Alternatively, the filtration apparatus may be configured to filter particulates from a gaseous influent (e.g., the exhaust from a chemical processing area or chamber, the exhaust gases from a coal or oil-based furnace or a waste incinerator, etc.).

Each filtration apparatus has a rotating body or member 106 having a cylindrical or toroidal shape, such as a drum or ring, as shown. The rotating member 106 is configured to rotate continuously during the filtration process. FIG. 1 shows a cross-section of the filtration system halved along a central or center line 100, with which a rotation shaft 108 is aligned. The rotating member 106 (e.g., a drum) is attached to and supported by the rotation shaft 108. The rotation shaft 108 is mounted on a motor 107 for spinning the rotation shaft 108. The motor 107 is capable of spinning the rotation shaft 108 at any desired rate (e.g., between 0 and about 3000 RPM, 200 to 1200 RPM, or any other range of values therein).

In exemplary embodiments, the rotating member 106 may have a diameter of from 50 to 200 centimeters, from 1 to 5 meters, from 3 to 15 meters, or any other range of values suitable for a given application. The size of the drum and the rotational speed applied to the drum can be tailored or designed to provide a system with efficient operation that reduces power consumption relative to a pressure-based system that outputs a similar quantity of purified fluid or gas.

The centrifugal filtration apparatus further includes an influent inlet 101, aligned with or along the center of the rotating member 106 and the rotation shaft 108. The influent inlet 101 is configured to deliver an influent fluid (e.g., water or organic solvent) or gas (e.g., $CO_2$, CO, $N_2$, $O_2$, air, Ar, etc.), contaminated with particulate matter (e.g., silt, heavy metals, organic solids, microorganisms, etc.) to a system of pipes and filters mounted on the rotating member 106. As shown in FIG. 1, an exemplary water filtration system may include an influent catch 102 (i.e., a central receiving pipe) for receiving influent from the influent inlet or supply pipe 101. However, any other fluid or gas may be filtered and/or purified using the same apparatus, perhaps with minor modifications that will be readily apparent to those skilled in the art. The influent catch 102 is aligned with the center of the rotating member 106 and the rotation shaft 108. The centrifugal filtration apparatus may further include a clean water source (not shown) for supplying clean water through the influent inlet 101 during a backwash process, which is described below in the description of exemplary filtration methods.

Figure 2A:
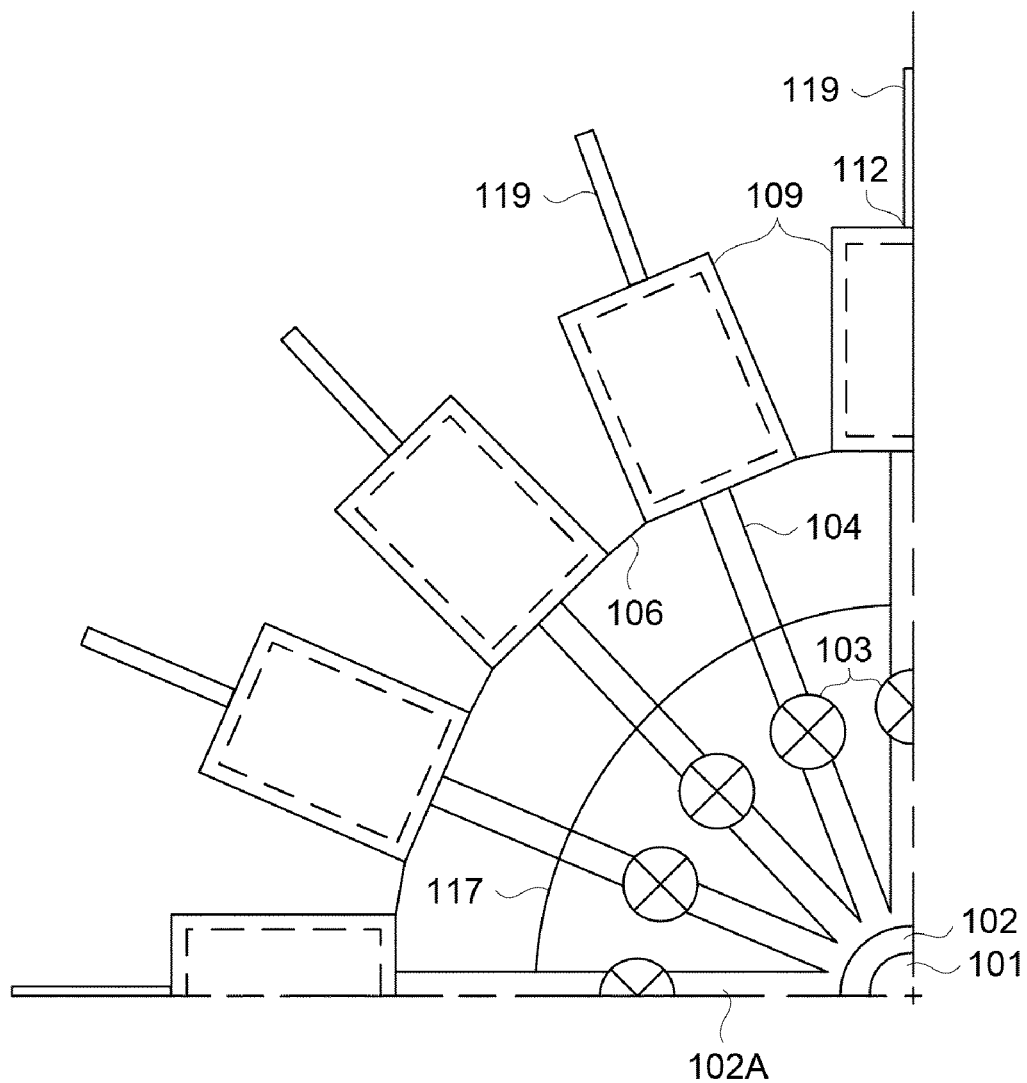
FIG. 2A provides a system diagram showing a transactional, top-down view of an exemplary embodiment of the centrifugal filtration apparatus of FIG. 1.

As shown in FIGS. 1 and 2A, the influent catch 102 is attached to a plurality of radiating delivery pipes 102A. The radiating delivery pipes 102A radiate out from the influent catch 102, generally along a single horizontal plane at the distal end of the influent catch 102. The radiating delivery pipes 102A may be arranged in a symmetrical pattern, such that they are evenly distributed around the influent catch 102. For example, there may be from 4 to 24 (e.g., 4, 6, 8, 12, or 16) delivery pipes 102A extending radially away from the influent catch 102. Each radiating delivery pipe 102A is attached to a set of pipes (e.g., 104, 105) and valves (e.g., 103) configured to deliver the influent to a plurality of filter cartridges 109. For example, the radiating delivery pipes 102A are each connected to a feed pipe 105 and a backwash pipe 104.

The radiating delivery pipes 102A are each connected to divisional (e.g., 3-way) valves 103. The divisional valves 103 are situated at the junction of each radiating delivery pipe 102A with a feed pipe 105 and a backwash pipe 104, as shown in FIG. 1. The divisional valves 103 control the flow of the influent from the radiating delivery pipes 102A to a set of feed pipes 105. The divisional valves 103 also control the flow of clean water from the clean water source through backwash pipes 104 during a backwash process. Alternatively, backwash pipes 104 may independently supply clean water (or fluid or gas) to outer chambers 112 from a separate supply pipe and/Each of the division valves 103 may be configure to have three positions that each result in one of the following: the flow of influent is blocked to both the feed pipe 105 and the backwash pipe 104, the influent is allowed to flow to the feed pipe 105 while the flow of backwash is blocked, or the flow of influent is blocked to the feed pipe 105 but allowed to flow to the backwash pipe 104.

Figure 3:
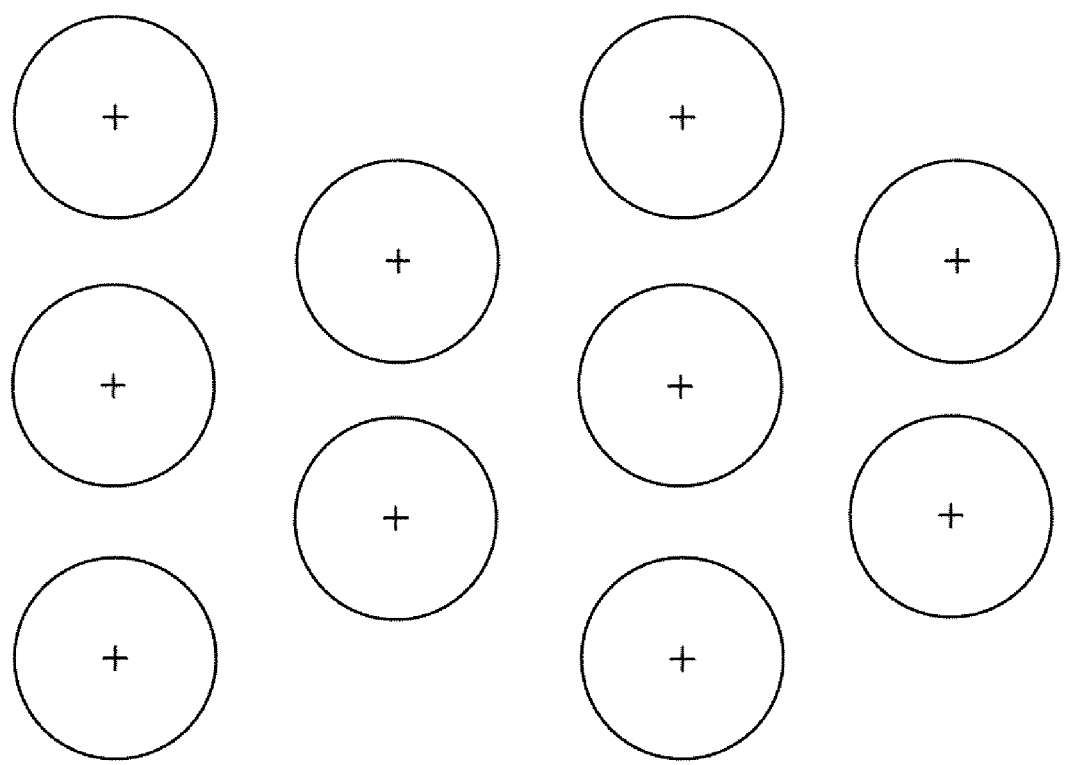
FIG. 3 shows an arrangement of cylindrical filter cartridges along an outer wall of a rotational drum in one exemplary embodiment of a centrifugal filtration apparatus.

In the exemplary embodiment shown in FIG. 1, the feed pipes 105 branch in a manifold arrangement into several feed inlets 111 configured to deliver influent to the filter cartridges 109 when the division valves 103 are positioned to allow the flow of influent to the feed pipe 105. In the exemplary embodiment depicted in FIG. 1, the feed pipes 105 branch into three feed inlets. However, the feed pipes 105 may be alternatively configured to branch into greater or fewer feed inlets (e.g., 1 or 2, or 4 to 30). Furthermore, the number of feed inlets may vary from one feed pipe to the next feed pipe within the same centrifugal filtration apparatus. For example, FIG. 3 shows an arrangement of filter cartridges 109 along a wall of rotating member 106. As shown, the arrangement of the filter cartridges 109 alternates between vertical columns of 3 and vertical columns of 2. Each of these vertical columns of filter cartridges 109 are fed by feed inlets 111 from a feed pipe 105. Thus, the feed pipes 105 in the example of FIG. 3 alternate between 2 and 3 feed inlets.

FIG. 3 is meant only as an example arrangement of the filter cartridges 109 and feed inlets 111. Optionally, the filtration apparatus may be configured to have other alternating arrangements of the filter cartridges 109, feed inlets 111, feed pipes 105 and valves 103. For example, the filter cartridges 109 and the feed pipes 105 may be arranged in alternating patterns where adjacent vertical columns have ratios of filter cartridges of n:n+x, wherein n is the range of integers of 1 to 20, and x is in the range of integers of 0 to 10. In further alternatives, the cartridges may also be arranged along the outer wall of the rotating member in any symmetrical pattern along the outer wall of the rotating member 106. In a further alternative, each feed pipe 105 may connect with a single filter cartridge 109. Additional valves may be located in pipe 105 between adjacent inlets 111 and/or the junctions of the manifold may be located at the top of the drum 106, before valve(s) 103.

The feed inlets 111 of feed pipes 105 are affixed to the wall of the cylindrical rotating member 106, and each feed inlet 111 effectively passes through the outer wall to connect with a single filter cartridge 109. Each filter cartridge 109 may have a tubular or cylindrical shape, wherein the filter cartridge 109 is arranged on the exterior of the outer wall of the rotating member 106 such that a central axis of the filter cartridge 109 radiates outwardly from the rotating member 106. Each inlet 111 is connected to a cylindrical filter cartridge 109 such that the inlet and the filter cartridge 109 to which it is connected are aligned (e.g., concentrically aligned).

Figure 4A:
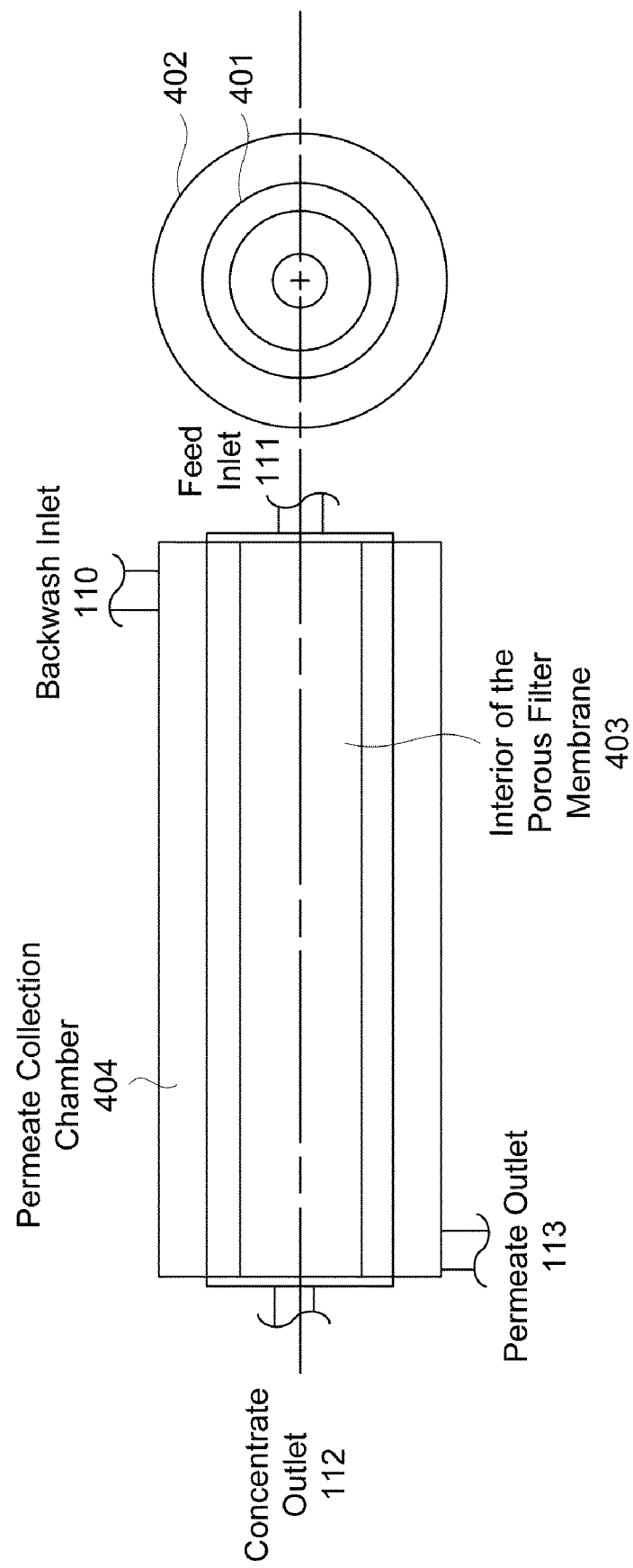
FIG. 4A shows a cross-sectional view of one exemplary embodiment of a cylindrical filter cartridge, including a single tubular filter membrane or a plurality of concentric tubular filter membranes.

FIG. 4A shows an exemplary embodiment of a filter cartridge. The filter cartridge generally has a tubular shape with a central axis, in which the cross-section transverse to the central axis may be any shape (e.g., square, rectangular, circular, oval, hexagonal, octagonal, irregular [e.g., to fit within certain dimensions or in a certain arrangement around body 106], etc.), but preferably the filter cartridge is cylindrical. The feed inlet 111 is directly connected to an inner chamber of the filter cartridge 109, which is generally the interior region of a porous filter 401. The inner chamber is isolated from the outer chamber (defined by the outer wall 402) of the filter cartridge by the porous filter 401 and seals or caps at one or both ends of the filter 401. The porous filter 401 also has a tubular shape with a central axis, in which the cross-section transverse to the central axis may be any of a wide variety of shapes (e.g., square, rectangular, circular, oval, hexagonal, octagonal, etc.), but preferably the porous filter 401 is also cylindrical. The seal(s) have openings for the inlet 111 at a near end of the filter 401 and a concentrate outlet 112 at a distal end of the filter 401 (when the concentrate outlet 112 has an outer diameter less than the inner diameter of the filter 401). The separation of the inner and outer chambers of the filter cartridge allows only a permeate (i.e., a filtered fluid) to pass through the porous filter 401 into the outer chamber, where a permeate outlet 113 (which is connected to the outer chamber) transports the permeate to a collection vessel or chamber. The distal end of the porous filter 401 is connected to a concentrate outlet 112, where a concentrate from within the porous filters 401 can be drained or collected during filtration (but after the influent has passed through the filter 401).

Figure 4B:
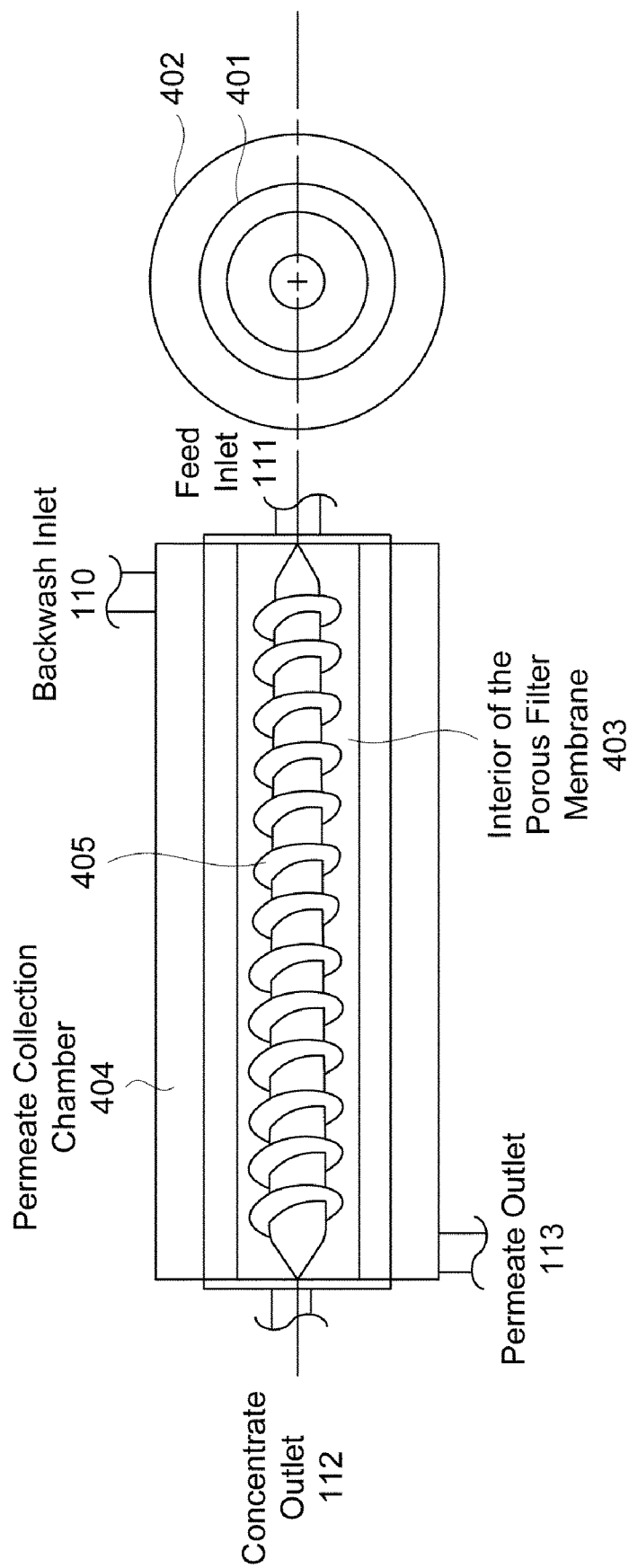
FIG. 4B shows a cross-sectional view of an exemplary alternative embodiment of a cylindrical filter cartridge, including a screw-shaped or spiral insert placed in the filter membrane.

FIG. 4B shows an exemplary alternative embodiment of a cylindrical filter cartridge, including a screw-shaped, helical or spiral insert 405 in the filter membrane. In one embodiment, insert 405 has an orientation substantially the same as the spiral flow of influent through the interior 403 of the membrane 401. Typically, the insert is fixed and/or stationary within the interior 403 of the filter membrane 401. The insert 405 may have essentially any number of turns or threads compatible with the design of the filter of FIG. 4B or the apparatus of FIGS. 1-2. It is believed that the insert 405 works in conjunction with the Coriolis effect to increase the centrifugal force and/or rate of flow of influent across the inner surface of the membrane 401.

Figure 5:
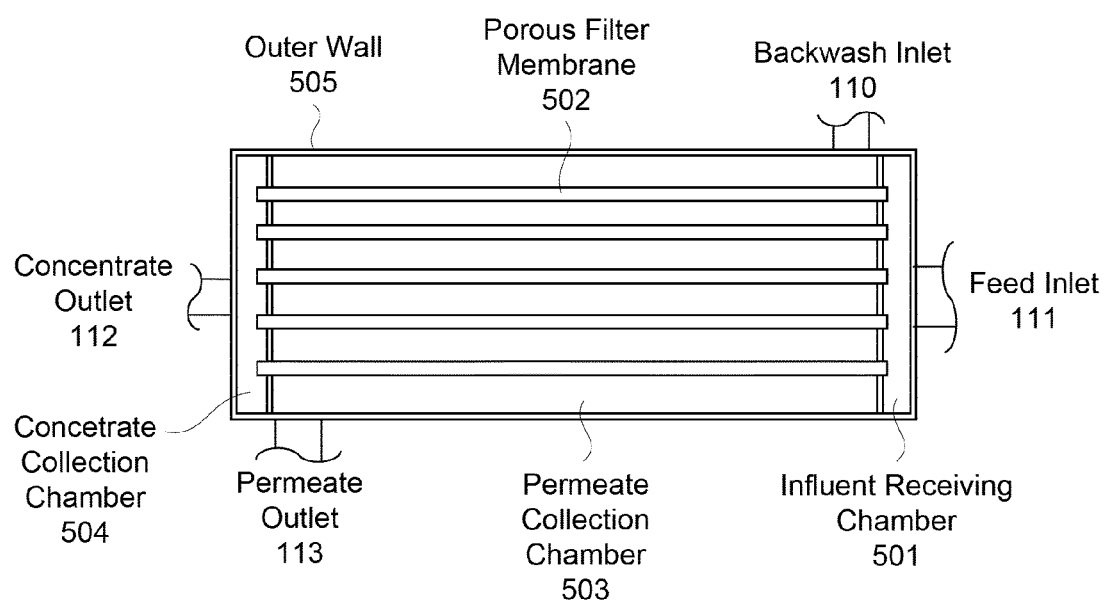
FIG. 5 shows a cross-sectional view of an alternative exemplary embodiment of a cylindrical filter cartridge, including multiple tubular filter membranes.

FIG. 5 shows an alternative embodiment of a filter cartridge. The feed inlet 111 is directly connected to an influent receiving chamber 501 of the filter cartridge. The receiving chamber 501 is connected to a plurality of porous filters 502 and is isolated from a permeate collection chamber 503. The filters 502 may be arranged concentrically in one or more cylinder-shaped arrangements, or the filters may be bunched together in a substantially parallel, but somewhat random, arrangement running down the length of the permeate collection chamber 503. This arrangement allows the influent to pass from the receiving chamber 501 into the porous filters 502, where the permeate passes through the porous filters 502 and into the permeate collection chamber 503. The distal ends of the porous filters 502 are connected to a concentrate collection chamber 504, where a concentrate from within the porous filters 502 can be collected during a filtration process. The porous filters 502 may have pinched, narrowed or drawn-down distal ends, in order to reduce the diameter of the outlet hole and increase the fluid pressure within the porous filters 502. (The same technique may be applied to the exemplary filter cartridge of FIG. 4A.) The concentrate collection chamber 504 receives the concentrate from each of the filters 502, and is attached to the concentrate outlet 112 for draining or transporting the concentrate to an external locations (e.g., to be pumped or otherwise fed back into the influent catch 102; see FIGS. 1-2).

The outer wall (e.g., 402 or 505) of the filter cartridge comprises a rigid material that can withstand rotation of the centrifugal filtration apparatus at high speeds, and that is substantially non-reactive with the permeate. The outer wall may comprise a rigid polymeric, fiberglass, or metal (e.g., stainless steel) housing. The porous filters 401 or 502 may comprise a porous filter membrane having a pore size in a range of from about 0.0005 to about 0.1 µm, about 0.01 to about 100 µm, 0.1 to about 50 µm, about 1 to 500 µm, or any other range of values therein. The porous filter membranes may also have a pore distribution of in the range of from about 10 to about 10,000,000 pores/cm², about 100 to about 100,000 pores/cm², or any other range of values therein.

The porous filter(s) may be made from any of a number of materials appropriate for microfiltration or ultrafiltration applications. The porous filter membrane may comprise, for example, a fabric, a polymeric material, and/or a naturally hydrophobic material, such as a polysulfone (PS), polyethersulfone (PES), polypropylene (PP, which is appropriate for filtering gases), or polyvinylidenefluoride (PVDF). For example, a double-walled hollow fiber ultrafiltration membrane (or other membrane comprising hollow fibers) can be formed from high-grade polymeric materials such as those described herein. These materials can provide a virtually defect-free, double-walled fiber membrane that is robust (less prone to breakage than single-wall hollow fiber membrane), has a high pore distribution (e.g., 500 to 2000 pores/cm²), and that does not compromise flux across the membrane. Alternatively, the filter membrane may comprise known nanotube materials (e.g., nanometer-scale carbon nanotubes, which may have pore sizes of 2 nm or smaller; see Holt et al., Science, vol. 312, May 19, 2006, p. 1034; the relevant portions of which are incorporated herein by reference).

Figure 6A:
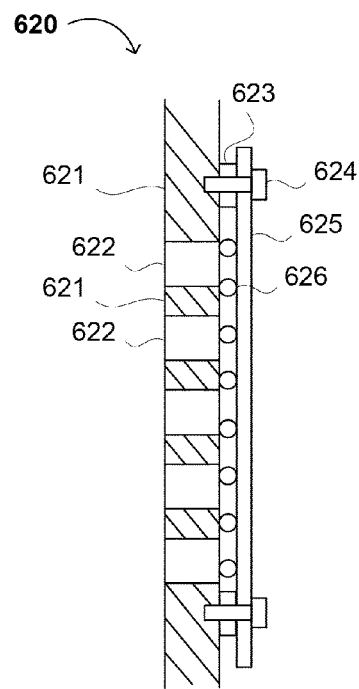
FIG. 6A shows a cross-sectional view of one exemplary embodiment of a porous filter membrane.

FIG. 6A shows an alternative exemplary embodiment of a porous filter 620 that can included in a filter cartridge. The porous filter includes a wall structure 621 that functions as a support layer with large holes 622 to allow a permeate to pass after it has been filtered across a porous membrane layer 625. A plurality of fasteners 624 (e.g., bolts) may fasten the porous membrane layer 625 to the wall structure 621 with insulator 623 and, optionally, a wire mesh 626 disposed between the bolts 624 and the wall structure 621. Alternatively or additionally, the membrane layers may be fastened to one another using a conventional adhesive. The porous membrane layer 625 may be one piece covering the entire wall structure 621. Alternatively, the porous membrane layer 625 may include several pieces of porous material (e.g., metal) fastened to different sections of the wall structure 621.

The porous membrane layer 625 may comprise a porous metal. The porous metal may have a uniform porosity. The base material for the porous metal may include nickel, titanium, molybdenum, chromium, cobalt, iron, copper, manganese, zirconium, aluminum, niobium, manganese, carbon, silicon, tungsten, or an alloy thereof. For instance, the porous metal may comprise stainless steel, an alloy containing predominantly nickel with molybdenum and optionally one or more other metals described above (e.g., a HASTELLOY corrosion-resistant metal alloy, commercially available from Haynes International), or an alloy containing predominantly nickel with chromium, niobium and optionally one or more other metals described above (e.g., an INCONEL metal alloy, commercially available from Special Metals Corp.).

The porous metal layer of the porous member layer 625 may be fabricated through a number of techniques. In one example, a powder of one or more of the metals listed above may be compacted to form a cylinder and then sintered to create a rigid structure. Alternatively, a sheet of the metal or metals may be made by a conventional process, then heated and bent or forged into a cylinder. The pore size in the porous filter can range from sub-micrometer to hundreds of micrometers (e.g., about 0.1 to 500 µm or any other range of values as described in this application). However, in general, the minimum pore size created by the compacting and sintering process is about 0.1 µm. Nonetheless, the pore size of the porous metal can be reduced further as described below.

Figure 6B:
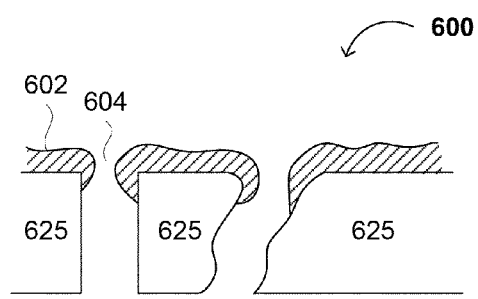
FIG. 6B shows a cross-sectional view of a porous metal layer in one exemplary embodiment of a porous metal filter membrane, the metal layer having a thin metal film or coating thereon.

As shown in FIG. 6B, the porous metal layer 625 may have a thin film 604 deposited thereon. The thin layer 604 may be deposited on the porous metal layer 625 by a physical vapor deposition (PVD) process (optionally in a vacuum), such as a high temperature vacuum evaporation, or a plasma-assisted sputter deposition. In an exemplary embodiment, the thin film 602 comprises the same metal (or alloy) used to form the porous metal layer 625. In alternative embodiments, a different metal, such as nickel, titanium, molybdenum, chromium, cobalt, iron, copper, manganese, zirconium, aluminum, carbon, tungsten, or a combination thereof, can be used. The thin film 602 is deposited to a thickness that does not cover the pores 604 in the porous metal layer 625. Little of the thin film 602 tends to be deposited in the interior of the pores 604 in the porous metal layer 625 due to a shadowing effect of the deposition process. Thus, the thin metal layer 602 tends to build up around openings 604 of each of the pores 602 during the deposition process, thereby narrowing the openings 604 without narrowing the interior of the pores 602. The ultra-thin film 602 enables the filter pore size to be reduced to a size less than the lower limit of the sintered porous metal layer (e.g., from about 0.1 to 5 µm) to a pore size in the range of about 0.01 to 1 µm, without a drastic reduction in the flow through the pores, since the pore diameter remains largely unchanged aside from openings 604.

Figure 6C:
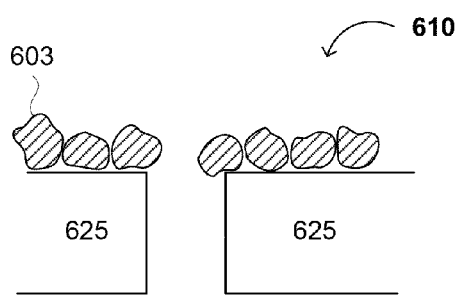
FIG. 6C shows a cross-sectional view of a porous metal layer in an alternative embodiment of a porous metal filter membrane, the metal layer having small metal particles deposited thereon.
Figure 7:
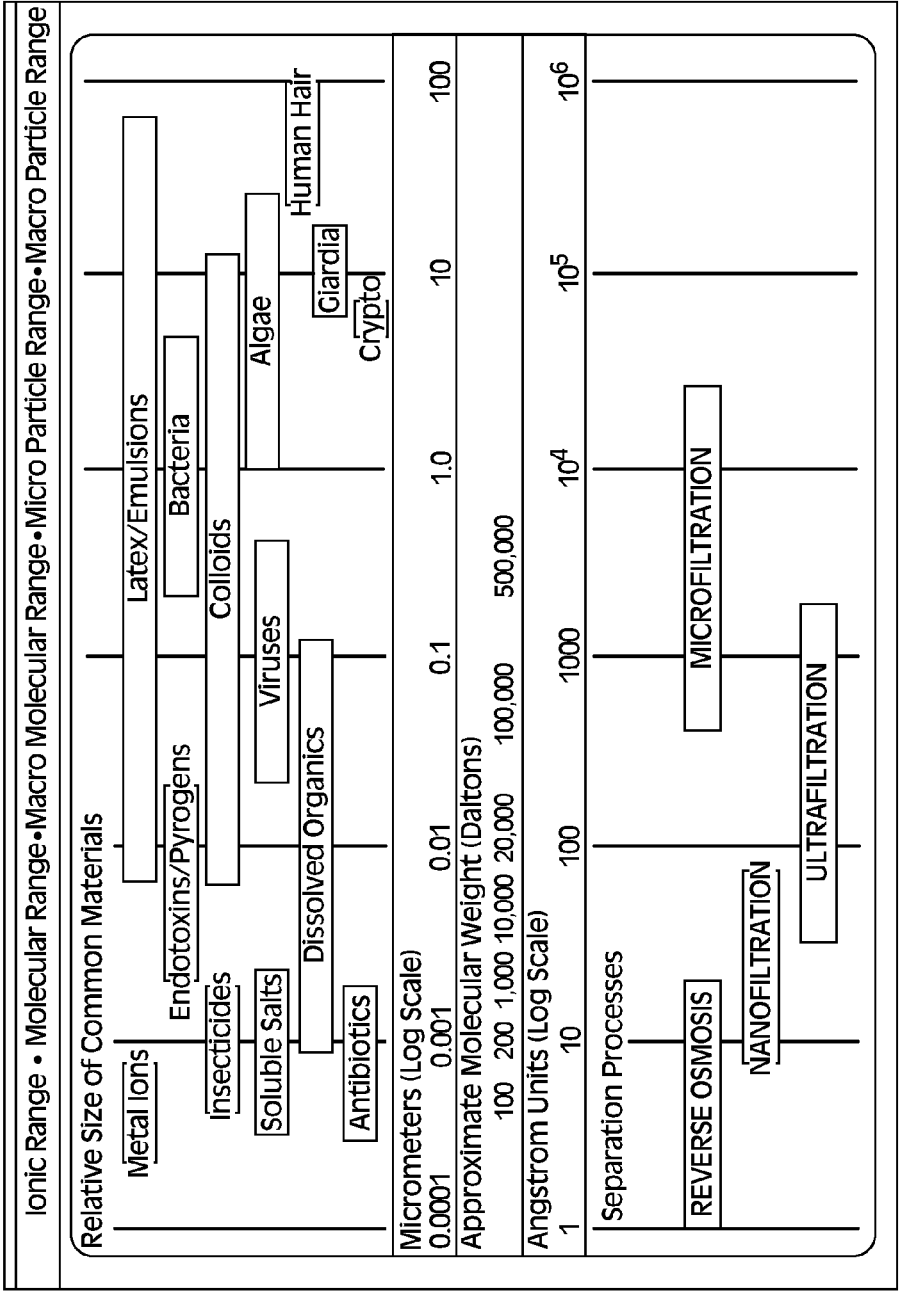
FIG. 7 is a graph showing a spectrum of membrane filter pore sizes and various particulate matter that can be removed, based on pore size of the filter.

FIG. 6C shows an alternative embodiment, wherein a layer of metal particles 603 is deposited on the porous metal layer, rather than an ultra-thin layer 602. In this embodiment, metal particles 603 are deposited onto the porous metal layer 625 by cathodic arc deposition. The metal particles may comprise the same metal used to form the porous metal layer 625. Alternatively, a different metal can be used, as described above. The particle may have a size in the range of 0.05 to 0.5 µm, comparable to the size of the pores. However, the particles do not cover the pores, but rather attach to a horizontal surface of porous metal layer 625, narrowing openings 604 of the pores near the surface. In a further alternative, a thin wire mesh may be attached to the porous metal layer. A plurality of fine mesh layers may be woven into or added together to form a thin wire mesh filter and attached to the internal side of the porous metal layer.

The filter membranes described herein (e.g., the configurations of FIGS. 6A-6C) provide a filter having great strength and durability that can filter very fine particles without a significant pressure-drop across the filter membrane. Additionally, particles in the influent that pass through the narrowed openings 604 of the pores will rarely become stuck in the pores, since the interior of the pores substantially retain their interior diameters during the deposition process for narrowing the openings 604, thereby reducing downtime for cleaning and improving efficiency of the filtration process.

The concentrate outlets 112 (see, e.g., FIGS. 1-2A) are connected to one of a plurality of concentrate collection pipes 119. The centrifugal filtration apparatus may be configured such that all of the filter cartridges 109 fed by a single feed pipe 105 are connected to a single concentrate collection pipe 119. Thus, each radiating delivery pipe 102A is indirectly connected to a single concentrate collection pipe 119, as shown in FIGS. 1-2A. Each concentrate collection pipe 119 includes a shut-off valve 120 at a draining end of the concentrate collection pipe 119 to control the flow of the concentrate. Partially closing the shut-off valve 120 may cause or create some back-pressure on the influent passing through the filter chambers 109, thereby increasing the amount or proportion of influent recovered as permeate.

The draining ends of the plurality of concentrate collection pipes 119 are positioned over a circular concentrate catch 116, as shown in FIG. 1. The concentrate catch 116 encircles the rotating member 116, thereby allowing the concentrate flowing from concentrate collection pipes 119 to flow constantly into the concentrate catch 116 as the rotating member 116 spins during a filtration process. Alternatively, the concentrate collection pipes 119 may be bent inwardly, under the drum 106, to a concentrate catch 116 that is more centrally located under the drum 106 to facilitate collection of the concentrate. The concentrate may be separated, collected in a dedicated concentrate collection vessel or tank (not shown), and used as described herein. Alternatively or additionally, the concentrate may be recycled back to influent catch 102 for further filtration and recovery of purified fluid or gas.

The permeate outlets 113 are connected to one of a plurality of a permeate collection pipes 118. The centrifugal filtration apparatus may be configured such that all of the filter cartridges 109 fed by a single feed pipe 105 are connected to a single permeate collection pipe 118. Thus, each radiating delivery pipe 102A may be indirectly connected (with a porous filter membrane 620 therebetween) to a single permeate collection pipe 118. Each permeate collection pipe includes a shut-off valve 114 at a draining end of the permeate collection pipe 118 to control the flow of the permeate. The draining ends of permeate collection pipes 118 are positioned over a circular permeate catcher 115, as shown in FIG. 1. The permeate catcher 115 encircles the rotating member 115, thereby allowing the permeate flowing from permeate collection pipes 118 to flow constantly into the permeate catcher 115 as the rotating member 106 spins during a filtration process. the concentrate collection pipes 119 may be bent inwardly, under the drum 106, to a concentrate catch 116 that is more centrally located under the drum 106 to facilitate collection of the concentrate. The permeate may be collected in a dedicated permeate collection vessel or tank (not shown), and used as described herein. Alternatively, the permeate may be recycled back to influent catch 102 for use in the cleaning process described herein.

All of the components of the centrifugal filtration apparatus described above (except for the permeate catcher 115 and the concentrate catch 116) are affixed or attached either directly or indirectly to the rotational member 106, and thus are configured to spin with the rotational member 106. It should be understood that the embodiments of the fluid filtration system described above are not limited to the components and arrangements described. Variations that are not inconsistent may be mixed, matched and combined with technologies known in the relevant art(s).

The filtration system may further comprise a monitor configured to determine the flow rate and/or flux of flow (optionally as a function of rotation rate or speed) for the permeate and/or concentrate. The filtration system may further comprise a second monitor configured to determine a particle size distribution found in the permeate, optionally as a function of rotation rate or speed and/or chemical identity of the influent.

Figure 8:
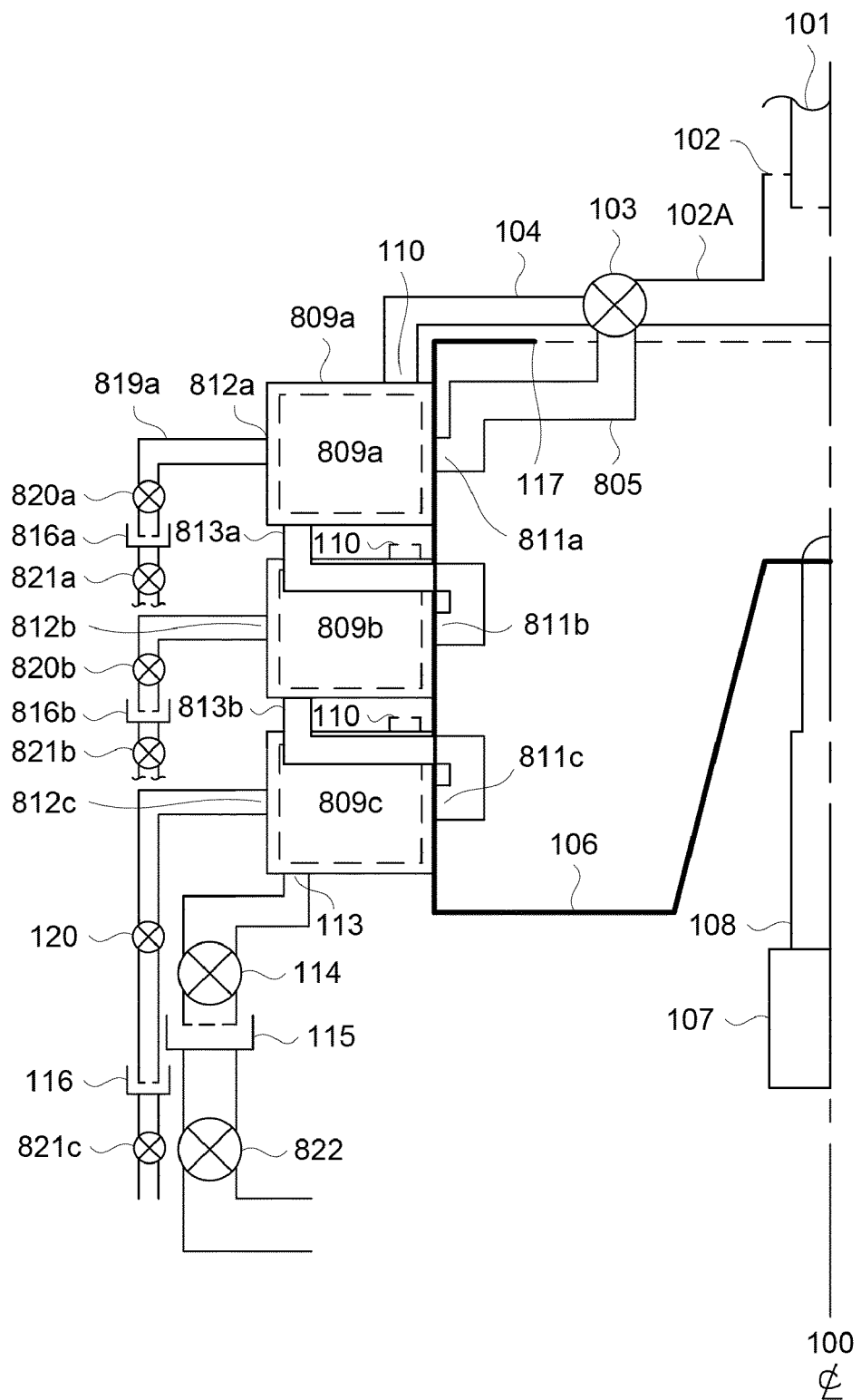
FIG. 8 is a system diagram showing a cross-sectional view of an alternative embodiment of a centrifugal filtration apparatus.

FIG. 8 shows an alternative example of the present filtration system, in which structures and features therein that are substantially the same as corresponding structures and/or features in FIG. 1 have the same identifying number, and structures and features therein that are similar to corresponding structures and/or features in FIG. 1 have the same last two digits in the identifying number (not including any final letter in the identifying number). Differences between the systems of FIGS. 1 and 8 will be described.

The filtration system of FIG. 8 includes first, second and third filters 809a, 809b and 809c, having first, second and third membranes with first, second and third pore sizes, respectively. In one example, the first pore size is larger than the second pore size, and the second pore size is larger than the third pore size. Although 3 such filter stages are shown, any integer number of stages greater than 1 may be so configured.

Feed inlet 811a supplies the feed fluid or gas to first filter 809a. First permeate collection pipe 813a transports the permeate from the first filter 809a to feed inlet 811b of the second filter 809b, and second permeate collection pipe 813b transports the permeate from the second filter 809b to feed inlet 811 c of the third filter 809c. The output of permeate collection pipe 113 can be controlled by valve 114, and the flow rate, the particle size, and/or the solids content of the permeate collected in permeate catch 115 may be monitored by one or more monitors 822.

Each of the first, second and third filters 809a, 809b and 809c have a concentrate outlet 812a, 812b and 812c, respectively equipped with a concentrate collection tube 819a, 819b and 819c. The flow rates of concentrate and/or the pressure within the interior of the corresponding filter membranes may be controlled by valves 820a, 820b, and 820c. Similarly, the flow rates, particle sizes, and/or solids content of the concentrate collected in concentrate catches 816a, 816b and 116 may be monitored by one or more monitors 821a, 821b, and 821c. Information from the monitors 821a, 821b, 821c and 822 may be provided to a controller or microprocessor (not shown), which may then turn on, turn off, or adjust any of the valves 103, 114, 820a, 820b and/or 820c (as well as the flow of influent into influent inlet 101) from the received data to control the flow of gas or fluid through the various parts and/or locations in the apparatus.

The filtration system(s) described above allow for a process that uses centrifugal force created by the rotation of the rotational member 106 around the centerline 100, as shown in FIGS. 1 and 8, to filter particles from liquids or gases. Additionally, the design and arrangement of the filter cartridges allows for the Coriolis effect to cause a spiral flow of the influent around an axis substantially aligned with a center of the individual filter or filters within each filter cartridge. The spiral cross-flow of the influent within the filter as a result of the Coriolis effect causes the influent to exert further pressure on the inner wall of the porous filter membrane, allowing for more efficient filtration of the influent, and substantially wash away any solid material that may blind the membrane (or otherwise block its pores) during the filtration process, increasing the length of time that the filter cartridge can be operational.

Exemplary Method of Making a Fluid Filtration System

According to embodiments of the present invention, a method of making a filtration apparatus may comprise attaching each of a plurality of cylindrical filters circumferentially to a corresponding plurality of delivery pipes extending radially from a central receiving pipe in a central body, each of the cylindrical filters having a distal end through which a concentrate passes, and one or more porous membranes with a pore diameter in a range of about 0.1 to 500 μm; placing one or more outer chambers around one or more of the cylindrical filters, each outer chamber being configured to collect a permeate passing through the cylindrical filter(s); attaching an outlet pipe to each of the outer chambers, each outlet pipe being configured to transport the permeate away from the filtration apparatus (e.g., to a holding tank); and operationally joining a drive mechanism or motor to the central body, the drive mechanism or motor being configured to rotate the central body. The centrifugal filtration apparatus formed by this method may be used to remove particulate matter from fluids or gases, and may be particularly suitable for a number of applications for filtering and purifying fluids such as water.

For example, the apparatus(es) may be utilized in municipal or other regional wastewater treatment, household water purification, recycling industrial solvents, purifying pharmaceutical and blood products, scrubbing industrial exhaust gases, purifying specialty gases, and water purification in food product industries, among other filtration applications.

The rotating member 106 (which may be cylindrical, toroidal or other shape suitable for rotating, and which may have a diameter in a range of, for example, 50 to 200 centimeters) is mounted on, attached to and/or supported by the rotation shaft 108. The rotation shaft 108 is mounted on a motor 107 which is configured to rotate or spin the rotation shaft 108. The motor 107 is capable of spinning the rotation shaft 108 at a rate of between 0 to about 3000 rpm (or other rate as described herein). The size of the rotating member 106 can be selected or designed to suit the application of the centrifugal filtration apparatus and provide a system with efficient operation(s) and/or reduce power consumption. The motor 107 is largely conventional. Thus, in one step, the method of making the present filtration apparatus may comprise mounting the central rotating member 108 into a fitting in the motor 107, or assembling the central rotating member 108 and the motor 107 to enable the motor 107 to rotate or spin member 106 at a low speed or high speed, as described herein.

The influent inlet 101, is aligned with a center of the rotating member 106 and the rotation shaft 108. The influent inlet 101 can be attached to pipe carrying or a vessel holding a source of influent fluid (e.g., waste water) for filtration and a source of clean fluid (e.g., filtered water) for a backwash process. In an exemplary embodiment, the influent inlet 101 is stationary, and thus is not attached to the rotating member 106 to allow the rotating member 106 to rotate freely. However, the influent inlet 101 may be positioned directly over or in the influent catch 102.

A system of pipes and filters mounted on the rotating member 106 delivers the influent to the filter cartridges 109. An influent catch 102 may be attached to an uppermost surface of the rotating member 106 such that the influent catch 102 is aligned (e.g., concentrically aligned) with the center of the body 106, rotating shaft 108, and/or the influent inlet 101. Additionally, the influent catch 102 may have a wider diameter than the influent inlet 101, and the influent inlet 101 may be nested within the influent catch 102 to allow the influent catch 102 to collect substantially all of the influent flowing from the influent inlet 101.

The influent catch 102 is attached to a plurality of radiating delivery pipes 102A, described elsewhere herein. The radiating delivery pipes 102A may have a symmetrical pattern radiating out from the influent catch 102 along a substantially horizontal plane at the distal end of the influent catch 102, such that they are evenly distributed around the influent catch 102. Each radiating delivery pipe 102A is then attached to valve 103, to which are fitted a backwash or cleaning pipe 104 and an influent manifold 105 configured to deliver the influent to a plurality of filter cartridges 109.

Valves 103 are connected between the radial delivery pipes 102A, the feed pipes 105 and the backwash pipes 104. The 3-way valves 103 are situated at the junction of a delivery pipe 102A with a feed pipe 105 and a backwash pipe 104, as shown in FIG. 1. The feed pipes 105 include feed inlets 111 at their distal ends for supplying the influent to the filter cartridges 109. The feed inlets 111 of feed pipes 105 penetrate or are affixed to the outer wall of the cylindrical rotating member 106, so that each feed inlet 111 passes through the outer wall. Each feed inlet 111 may then be connected to an inlet of a single filter cartridge 109 using a conventional male-female type attachment or fitting.

The backwash pipes 104 include backwash inlets 110 at their distal ends for draining the backwash into the filter cartridges 109. The backwash inlets 110 of backwash pipes 104 may be connected to the outer chambers of the filter cartridges 109 using a conventional male-female type attachment or fitting similar to that for the feed inlets 111.

Each filter cartridge 109 is attached to the exterior of the cylindrical rotating member 106 (generally by a detachable connection mechanism to facilitate more thorough cleaning or replacement of the filter cartridge 109), such that a central axis of the cylindrical filter cartridge extends from the rotating member 106. Each feed inlet 111 is connected to a filter cartridge 109 such that the feed inlet and the filter cartridge 109 to which it is connected are aligned (e.g., concentrically aligned). The feed inlet 111 may be in direct fluid communication with an inner chamber of the filter cartridge 109, which is defined by a porous filter (e.g., 405 or 502).

Each permeate outlet 113 (which is connected to the outer chamber of the filter cartridge 109) is connected to one of a plurality of permeate transport pipes 118. The filtration system may be configured such that all of the filter cartridges 109 fed by a single feed pipe or manifold 105 are connected to a single permeate collection pipe or manifold 118. Thus, each radial delivery pipe 102A is in indirect fluid communication (with one or more porous filter membranes 620, which may be arranged in parallel, therebetween) to a single permeate collection pipe 118. A shut-off valve 114 may be inserted in each permeate collection pipe 118 at a draining end to control the flow of the permeate. Each permeate transport pipe or manifold 118 may be attached to corresponding permeate outlet(s) 113 using a conventional male-female type attachment or fitting. Preferably, the attachment or fitting between the permeate transport pipe or manifold 118 and the permeate outlet(s) 113 is easily detachable (e.g., it comprises a quick-release fitting or ring-type fitting).

In an exemplary embodiment, each permeate pipe or manifold 118 is aligned vertically with the permeate catch 115 to allow the efficient flow and collection of the permeate. The draining ends of the plurality of permeate collection pipes 118 are positioned over a circular permeate catcher 115, as shown in FIG. 1. The permeate catcher 115 encircles the rotating member 115, thereby allowing the permeate flowing from permeate collection pipes 118 to flow constantly into the permeate catcher 115 as the rotating member 106 spins during a filtration process. The permeate catcher 115 (which is not necessarily part of the filtration apparatus) is generally in fluid communication with a permeate storage vessel or chamber having a volume sufficient to store at least one day's (e.g., several days) production or permeate. The storage vessel or chamber may also be equipped with a pump for transporting or distributing collected permeate to other destinations (e.g., including influent inlet 101 or catch 102 for cleaning).

The distal ends of the porous filters (e.g., 401 or 502) within the filter cartridges are connected to or equipped with a concentrate outlet 112, where a concentrate from the interior of the porous filters can be drained and/or collected. The concentrate outlets 112 are connected to one of a plurality of concentrate collection pipes 119 by an attachment mechanism similar to those described herein. The fluid filtration system may be configured such that all of the filter cartridges 109 fed by a single feed pipe or manifold 105 are connected to a single concentrate collection pipe or manifold 119. Thus, each delivery pipe 102A is in indirect fluid communication with a single concentrate collection pipe 119, as shown in FIGS. 1 and 2A. A shut-off valve 120 may be inserted into each concentration pipe or manifold 119 to control the flow of the concentrate. In an exemplary embodiment, concentrate pipe 119 is aligned vertically with a concentrate catch 116 to allow the efficient flow and collection of the concentrate. The concentrate catch 116 encircles the rotating member 116, thereby allowing the concentrate flowing from concentrate collection pipes 119 to flow constantly into the concentrate catch 116 as the rotating member 116 spins during a filtration process. The concentrate catch 116 (which is not necessarily part of the filtration apparatus) is generally in fluid communication with a concentrate storage or transfer vessel/chamber. The concentrate vessel or chamber may be equipped with a pump for recirculating, transporting or distributing collected concentrate to another destination. For example, the collected concentrate may be recirculated to influent inlet 101, in which case the collection chamber or vessel may be configured to allow particulate material that passes through the filters 109 to settle in the collection chamber or vessel an d be removed by conventional techniques.

All of the components of the fluid filtration system described above (except for the influent inlet 101, the permeate catcher 115 and the concentrate catch 116) are affixed either directly or indirectly to the rotational member 106, and thus are configured to spin or rotate with the rotational member 106. It should be understood that the embodiments of the method of making a filtration system described above are not limited to the components and arrangements explicitly described herein. Variations that are not inconsistent with the described embodiments may be mixed, matched, and combined with other technologies described herein or known in the relevant art.

Exemplary Filtration Method(s)

According to embodiments of the present invention, a method of filtering an influent (e.g., comprising a fluid or gas) may comprise delivering the influent into one or more centrifugal filtration apparatuses having a central body and a distribution unit therein for delivering the influent to a plurality of cylindrical filters extending radially from the central body, each of the plurality of cylindrical filters having a distal end through which a concentrate passes and one or more porous membranes having a pore diameter in a range of about 0.1 to 500 µm; rotating the central body at a rate sufficient to filter the influent through the porous membranes; collecting a permeate passing through the porous membrane(s) in one or more outer chambers surrounding the cylindrical filter(s). The filtration method(s) of the present invention are generally suitable for removing particulate matter from fluids or gases, and are particularly suitable for a number of applications for filtering and purifying fluids. For example, the methods may be utilized in waste water treatment, household water purification, industrial solvent recycling, pharmaceutical and blood product purification, industrial exhaust gas scrubbing, and water purification in food product industries, among other fluid filtration applications.

Referring to FIG. 1, the exemplary filtration system is used to filter an influent (which may be water containing a particulate material or solute, such as an acid, base, salt, mineral, organic material, microorganism (giardia, algae, bacteria, viruses, etc.), other biological material [endotoxins, detritus, hair, feces, etc.], pyrogen, etc.). In an exemplary embodiment, the influent comprises waste water, contaminated with one or more of the contaminants listed above.

An exemplary sequence of steps for operating the continuous filtration device 100 shown in FIGS. 1-2A is listed as follows:

1. Turn on motor 107 to provide power to rotate the rotating member 106.
2. Introduce an influent into an influent catch 102 (e.g., by gravity) while the rotating member 106 is rotating.
3. While body 106 is rotating, the influent flows laterally and sequentially into radiating delivery pipes 102A, feed pipes 105 and feed inlets 111 due to centrifugal force caused by the rotation of rotating member 106.
4. From the feed inlets 111, the influent passes into the cylindrical filter cartridges 109 where the liquid or other material (e.g., gas) in the influent smaller than the pore size of the porous filter membrane pass through the filter membrane and are collected as a permeate in a permeate collection chamber. The spinning of the rotating member 106 creates centrifugal force that results in fluid pressure on the inner surface of the filter membrane in the filter cartridge by the Coriolis effect within the cylindrical filter (i.e. a force that causes the influent to spin around an axis of the cylindrical filter, resulting in an additional force that forces the liquid or gas through the membrane). These forces provide adequate pressure to efficiently filter the liquid or gas permeate with the porous filter membrane.
5. Filtered permeate is drained or collected from the permeate collection chamber through the permeate outlet 113 into a permeate pipe 113A, which drains the permeate into a permeate catcher 115. Thereafter, the collected permeate may be further processed as described herein.
6. A concentrate of the influent, containing material too large pass across the porous filter membrane, remains in the porous filter membrane during the filtration process, and then exits the filter cartridge via a concentrate outlet 112 into a concentrate pipe 119. The concentrate is then transported through the concentrate pipe 119 to a concentrate catcher 116. Thereafter, the collected concentrate may be further processed.
7. After a specific period of operation (which may be monitored by, the system is scheduled for a backwash or cleaning process to remove accumulated debris from the filter cartridge.

Pressure for the filtration process is created by rotating the member 106, which in one example is a cylindrical drum. The rotation results in centrifugal force pushing the influent against a porous filter membrane at a high pressure. Additional pressure is created due to the influent spinning in the porous filter membrane around an axis of the cylindrical filter. The member 106 is attached to the central rotation shaft 108 and rotated by the motor 107 configured to spin the rotational shaft 108.

The influent is introduced into the filtration system through the inlet 101. The influent may be introduced at a flow rate in range of about 1 to 10,000 liters per minute, or as otherwise described herein. The influent is delivered by the inlet 101 into the central influent catch 102. The inlet 101 and the influent catch 102 are aligned, but not connected, to allow the rotating member 106 to spin as the influent is delivered by the inlet 101.

The centrifugal force created by the rotation of the rotating member 106 forces the influent from the central influent catch 102 out into the delivery pipes 102A attached to the central influent catch 102. The flow of the influent from the delivery pipes 102A to the feed pipes 105 may be controlled by valves 103. During the filtration process, the valves 103 are positioned to allow the influent to flow freely and continuously from the delivery pipes 102A into the feed pipes 105. The centrifugal force created by the spin of the rotating member provides pressure to move the influent outward into the feed pipes 105, then into the filters 109. The valves 103 also enable the flow of clean and/or filtered permeate or other fluid/gas to clean the porous membranes within the filter cartridges 109.

The influent flows from the feed pipes 105 into one or more feed inlets 111 configured to deliver influent to the filter cartridges 109. The feed inlet 111 connects directly with an interior 403 of the porous filter membrane 401, and the influent is delivered into the interior 403 directly from the feed inlet 111.

In an alternative embodiment, the filter cartridges 109 comprise a plurality of porous filter membranes 502, as shown in FIG. 5. In such embodiments, the influent is delivered by the feed inlets 111 into a corresponding plurality of influent receiving chambers 501. Each influent receiving chamber is connected to the interior of a corresponding porous filter membrane 502, and the influent is delivered from the influent receiving chamber 501 into the porous filter membrane 502. Subsequently, the concentrate that does not pass across the porous filter membrane 502 remains within the interior of the porous filter membranes 502 and passes out from the membrane 502 through outlet 112.

Figure 2B:
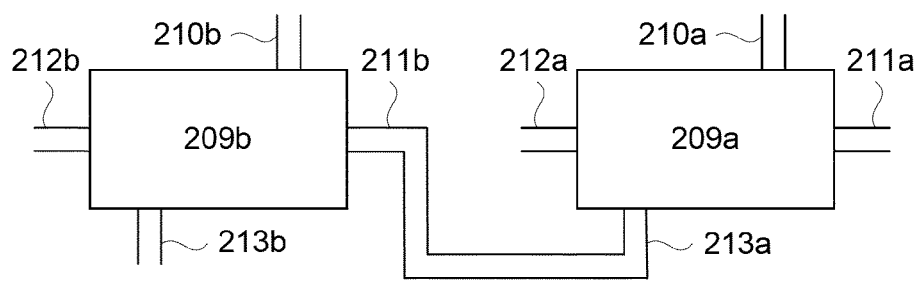
FIGS. 2B-C show alternatives for exemplary dual-filter arrangements, in which the filter cartridges are coupled serially or in parallel.
Figure 2C:
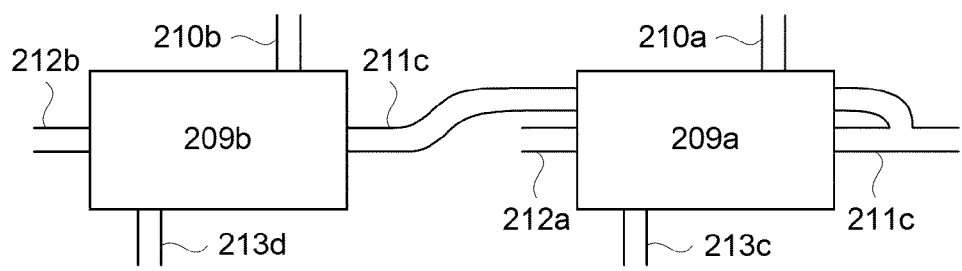

The present disclosure also includes further filter membrane arrangements, such as the nested filter membranes described above, which can be substituted for either of the embodiments described immediately above. Additionally, the filtration system may include a variety of different filter cartridges having different filter membrane arrangements therein (such as those described above) in the same apparatus or system. For example, as shown in FIG. 2B, the filter portion of the apparatus may comprise 2 or more different filters connected serially, in which the first filter 209a has a first porous membrane with a first pore size (e.g., from about 0.1 to about 100 μm) and the second filter 209b has a second porous membrane with a second pore size (e.g., from about 0.001 to about 0.1 μm). The concentrate collection pipes/manifold(s) 212a attached to the first filters 209a may transport the first concentrate to a first collection chamber or vessel, and the second concentrate collection pipes/manifold(s) 213b attached to the second filters 209b may transport the second permeate to a second collection chamber or vessel. The first concentrate will generally have a greater proportion of particulates and/or solids than the second concentrate, and the particulates and/or solids in the first concentrate will generally have a relatively larger size than the particulates and/or solids in the second concentrate. Thus, the first and second concentrates can be recirculated to different inlets (e.g., the second concentrate can be used as the cleaning fluid for the first filter in a backwash cleaning process) or recovered for different end uses (e.g., the first concentrate may be useful for biofuel, whereas the second concentrate may be useful for landscaping or certain industrial processes).

Alternatively, one may take advantage of the higher centrifugal force applied to the second filter 209b which is farther away from the central axis of the apparatus. In one such embodiment shown in FIG. 2C, inlets 211c supply the same feed to first and second filters 209a and 209b. Like the embodiment of FIG. 2B, in FIG. 2C, the membrane in the second filter 209b has a smaller pore size than that in the first filter 209a, but the membranes in the first and second filters 209a and 209b may have the same size in other embodiments. The permeate and concentrate collection pipes/manifold(s) 213a and 212a attached to the first filters 209a may respectively transport the first permeate and the first concentrate to first collection chambers or vessels, and the second permeate and concentrate collection pipes/manifold(s) 213b and 212b attached to the second filters may respectively transport the second permeate and the second concentrate to second collection chambers or vessels. Each of the first and second permeates may be used for different applications. The backwash inlets 210a and 210b in each of FIGS. 2B-2C may supply the same or different cleaning gas(es) or fluid(s).

Referring to FIG. 4A, for example, as the influent passes through the porous filter membranes 401, the liquids or gases that are small enough to pass through the porous filter membranes 401 result in a permeate that collects in the permeate collections chamber 404. Material that is too coarse to pass through the porous filter membrane 404 (or membrane 503, as shown in FIG. 5) remains within the interior of the porous filter membrane, and flows into concentrate outlet 112. In embodiments where the filter cartridge shown in FIG. 5 is used, the concentrate first flows into the concentrate collection chamber 504 before passing through the concentrate outlet 112. The concentrate then flows into concentrate pipes 119, which empty into concentrate catch 116. Thereafter, the collected concentrate may be further processed. For example, the material collected in the concentrate may be used as fertilizer or in a biofuel or fertilizer manufacturing process.

The method of filtering an influent may further comprise controlling the flow of concentrate or increasing the pressure within the porous filter membranes by partially closing a shut-off valve 120 situated within the concentrate pipe or manifold 119. The shut-off valves may be closed by an amount or for a period of time sufficient to allow a desired or predetermined increase in pressure within the interior of the porous filter membranes. Such an increase may be determined indirectly by the flow rate of permeate (e.g., the permeate flow rate increases as the pressure increases in the interior of the filter membrane). The flow of concentrate can be increased and the pressure in the membrane can then be reduced, periodically or in a single operation, by opening the shut-off valve 120. The shut-off valves 120 may implemented in a repeating cycle of closed and open states, or automatically in response to a permeate flow monitor or pressure monitor located at an appropriate position in an applicable pipe. For example, the valves may continuously alternate between a closed state lasting 1 to 60 seconds and an open state lasting 1 to 20 seconds. Alternatively, the shut-off valves can be partially closed to obstruct a predetermined percentage of the cross-sectional area of valve 120 or the concentrate pipe 119 to increase pressure within the porous filter membranes. For example, the shut-off valve 120 may be set to obstruct flow in a range of about 1 to 90% of the cross-sectional area of the valve 120 or concentrate pipe 119.

Referring to FIGS. 4-5, the permeate that passes through the porous filter membranes 401 or 502 is collected in the permeate collection chamber 404 or 503. The permeate flows from the permeate collection chambers 404 or 503 into permeate outlets 113 due to centrifugal force, gravity and/or the fluid pressure within the filter cartridges 109. In one embodiment, the outer chamber or filter cartridge 109 (FIGS. 1-2) may be tilted slightly to facilitate the flow of a liquid permeate towards the outlet 113. The permeate then flows into a permeate pipe (or manifold) 118, which empties into permeate catch 115. Thereafter, the collected permeate may be further processed. A shut-off valve 114, similar or valve 120, may be in each of the permeate pipes 118 to control the flow of the permeate. These valves may be closed during a backwash process to increase the fluid pressure within the permeate collection chamber 503.

The valves 103 also control a backwash flow for cleaning the porous membranes within the filter cartridges 109. During a backwash process, the valves 103 are positioned to allow the flow of an influent (in this case, a clean and/or filtered gas or fluid) from the distribution pipes 102A into backwash pipes 104, as shown in FIGS. 1 and 2. The influent then flows from the backwash inlet 110 into the permeate collection chambers 404 or 503 (see FIGS. 4 and 5) of the filter cartridges 109. A relatively slow rotational rate (e.g., 10-200 RPM) may be sufficient to minimize the Coriolis effect within the outer chamber of the filter cartridge 109, but force fluid passing from the outer chamber through the porous membrane into the interior of the porous membrane through the concentrate outlet 112, thereby loosening or unblocking any particulate matter that may have collected on the surface or in the pores of the porous membrane.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

CONCLUSION/SUMMARY

The present invention concerns a gas or fluid filtration system comprising one or more apparatuses for filtering gases and/or fluids (e.g., water) to remove particulate matter. The present invention also relates to method(s) of making the apparatus, and method(s) of filtering a gas or fluid using the apparatus. More particularly, embodiments of the present invention relate to apparatuses and methods that use centrifugal force and/or the Coriolis effect to push a gas or fluid to be filtered through a porous membrane or filter within the apparatus and separate a gas or liquid from particulate matter. The present invention reduced the amount of energy needed to purify a given quantity of gas or fluid, and/or increases the quantity of gas or fluid purified per unit energy relative to pressure-based systems. The present apparatus may be scaled to suit household, multi-unit residential, business, industrial and large-scale civil (e.g., municipal waste water treatment) applications.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A filtration system, having one or more apparatuses comprising:
   an inlet adapted to receive an influent to be filtered;
   a rotating central body having an influent distribution unit therein, the influent distribution unit having a central receiving pipe adapted to receive the influent and a plurality of delivery pipes extending radially from the central receiving pipe;
   a plurality of filters, arranged circumferentially around the central body, each attached to one of the plurality of delivery pipes and each having an inlet configured to receive the influent from one of the plurality of delivery pipes, a distal end through which a concentrate passes, and one or more tubular porous membranes with a pore diameter of up to about 500 µm;
   one or more outer chambers, each surrounding one or more of the filters, each outer chamber being configured to collect a permeate passing through the filter(s);
   a plurality of permeate collection pipes, each attached to one of the outer chambers and configured to transport permeate away from the outer chamber;
   a plurality of concentrate collection pipes, each attached to a distal end of either one of the filters or one of the outer chambers, and configured to transport concentrate away from the filter; and
   a drive mechanism or motor configured to rotate said central body and the filters.

2. The filtration system of claim 1, wherein the plurality of delivery pipes extend radially from the central receiving pipe in an evenly distributed arrangement.

3. The filtration system of claim 1, wherein a longitudinal axis of each of the plurality of filters is aligned with one of the plurality of delivery pipes.

4. The filtration system of claim 1, wherein each of the plurality of filters further comprises a screw-shaped or spiral insert in the tubular porous membrane(s).

5. The filtration system of claim 1, wherein each of the one or more tubular porous membranes includes (i) an outer support layer having holes to allow the permeate to flow into the one or more outer chambers, and (ii) an inner porous membrane attached to the outer support layer.

6. The filtration system of claim 5, wherein the inner porous membrane has a pore diameter in a range of about 0.1 to 10 µm.

7. The filtration system of claim 5, wherein the inner porous membrane has a pore diameter in a range of about 0.01 to 0.1 µm.

8. The filtration system of claim 5, wherein the inner porous membrane comprises a porous metal filter.

9. The filtration system of claim 1, wherein each outer chamber comprises a permeate collection chamber configured to collect the permeate from the filter.

10. The filtration system of claim 1, wherein each of the outer chambers includes a concentrate outlet pipe configured to drain or remove the concentrate from the cylindrical filter.

11. The filtration system of claim 1, wherein the distal end of each filter is connected to a distal chamber inside a corresponding one of the outer chambers.

12. The filtration system of claim 1, wherein the influent comprises water.

13. The filtration system of claim 1, comprising a plurality of the apparatuses, wherein each of the inlets receive influent from a common source, each of the apparatuses comprises a permeate collection chamber configured to collect the permeate from the plurality of outlet pipes, and the system further comprises a collection pipe receiving permeate from each of the permeate collection chambers.

14. The filtration system of claim 8, further comprising a thin metal layer on the porous metal filter, wherein the thin metal layer narrows openings of the pores in the porous metal filter.

15. The filtration system of claim 8, further comprising metal particles on the porous metal filter, wherein the metal particles narrow openings of the pores in the porous metal filter.

16. The filtration system of claim 15, wherein the metal particles have sizes in a range of from 0.05 to 0.5 µm.

17. The filtration system of claim 1, wherein the one or more tubular porous membranes each has a pore diameter in a range of about 0.1 to 10 µm.

18. The filtration system of claim 1, wherein a material of the one or more tubular porous membranes is selected from the group consisting of polysulfone, polyethersulfone, polypropylene, and polyvinylidenefluoride.

19. The filtration system of claim 5, wherein a material of the one or more porous metal filters is selected from the group consisting of nickel, titanium, molybdenum, chromium, cobalt, iron, copper, manganese, zirconium, aluminum, niobium, manganese, carbon, silicon, tungsten, and alloys thereof.

20. The filtration system of claim 5, wherein the one or more porous metal filters comprise stainless steel.

21. The filtration system of claim 1, further comprising a monitor configured to determine a flow rate and flow fluctuations of the permeate and the concentrate, and control a flow of the influent into the inlet in response to the flow rate and the flow fluctuations of the permeate and the concentrate.

22. The filtration system of claim 1, wherein the one or more tubular porous membranes comprise concentric tubular porous membranes in a nested arrangement.

23. The filtration system of claim 1, wherein the one or more tubular porous membranes comprise at least one hollow fiber membrane.

24. The filtration system of claim 12, wherein the influent comprises salt water or waste water.

* * * * *